United States Patent

[11] 3,566,914

| [72] | Inventor | Robert F. Koehler<br>Schonga, Lech, Upper Bavaria, Germany |
| [21] | Appl. No. | 730,875 |
| [22] | Filed | May 21, 1968 |
| [45] | Patented | Mar. 2, 1971 |
| [73] | Assignee | Hoerbiger Ventilwerke Aktiengesellschaft<br>Vienna, Austria |
| [32] | Priority | May 30, 1967 |
| [33] | | Austria |
| [31] | | A5049/67 |

[54] MULTIPLE-RING VALVE
1 Claim, 6 Drawing Figs.

[52] U.S. Cl. ................................................. 137/516.13,
137/512.15
[51] Int. Cl. ........................................................ F16k 15/14,
F04b 39/00
[50] Field of Search ........................................... 137/512.15,
516.13; 267/761

[56] References Cited
UNITED STATES PATENTS
3,265,085  8/1966  Koehler ........................  137/516.13
FOREIGN PATENTS
38,617  0/1903  Switzerland ..................  137/512.15

*Primary Examiner*—William F. O'Dea
*Assistant Examiner*—William H. Wright
*Attorney*—Watson, Cole, Grindle & Watson ABSTRACT: A multiple-ring valve, particularly for piston-type compressors, the valve plate of which is loaded by means of a cylindrically arcuate spring plate. The spring plate comprises concentric rings interconnected by means of radial webs located on a single diameter only, a radial slot being provided in the area of the webs.

PATENTED MAR 2 1971 3,566,914
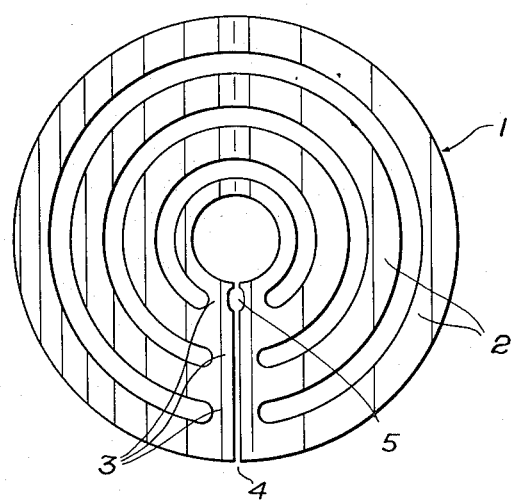
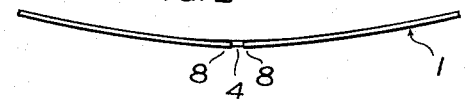
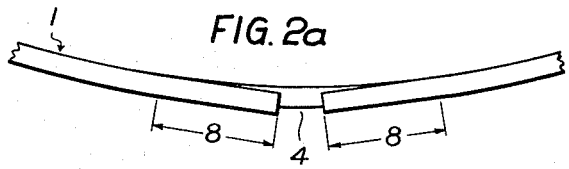
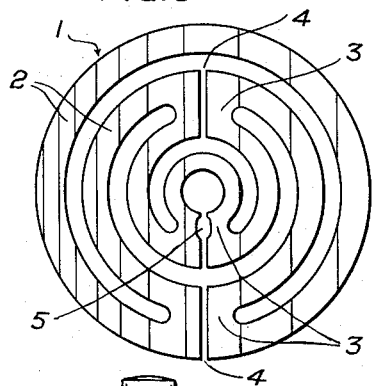
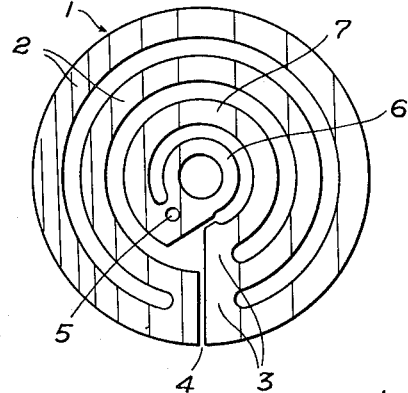
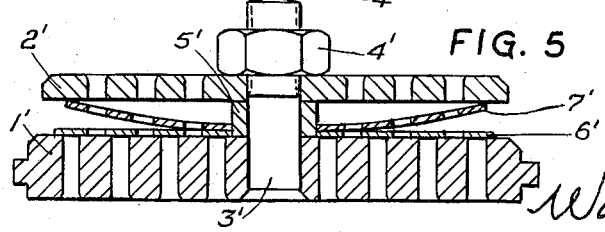
Inventor
Robert F. Köhler
By
Watson, Cole, Grindle & Watson
Attys.

MULTIPLE-RING VALVE

BACKGROUND OF THE INVENTION

The invention relates to a multiple-ring valve, particularly for use in combination with piston-type compressors, the closing member of which consists of a valve plate loaded by means of at least one arcuate spring plate formed by concentric rings, adjacent rings of each spring plate provided being interconnected by not more than two webs, all webs of the spring plate being located on the same plate diameter, at least one ring of each spring plate or all of the concentric rings being arcuate so as to present a cylindrical surface, the generating line of which extends in parallel relation to the spring plate diameter traversing the webs. It is, however, possible for the adjacent rings of each spring plate to be interconnected by means of a single web only, all webs being located either on the same side of the plate center or else alternatingly on different sides of the plate center.

Multiple-ring valves of this type and spring plates of a design as hereabove described are already known. As compared with the spring plates previously used in multiple-ring valves and featuring elastic tongues bent out of the plane of the plate, a plate-shaped curvature of the spring plate or a cylindrical curvature where a plurality of radial webs are distributed over the circumference of the spring plate, they distinguish themselves above all by their longer service life. As a result of a substantial reduction of the webs provided between the plate rings and the particular curvature of the spring plate leaving the web axis uncurved, inherent tensions and internal stresses of the spring plate are avoided and bending stresses diminish considerably. Furthermore, the spring plate will be softer as compared with arcuate spring plates comprising a plurality of webs, as a result of which it is possible to use spring plates of greater thickness without impairing the elasticity of the system, thereby also further increasing operational safety.

SUMMARY OF THE INVENTION

It is the object of the present invention to further improve upon the aforesaid multiple-ring valve and in particular, upon the spring plate used in connection therewith.

The invention consists in a multiple-ring valve, particularly for piston-type compressors, comprising a valve seat and a valve guard arranged in spaced relation to same, a closing member located between the valve seat and the valve guard and loaded by means of at least one arcuate spring plate formed by concentric rings interconnected by means of webs, adjacent rings of each spring plate being interconnected by not more than two webs, all of the webs of the spring plate being located on the same plate diameter, at least one ring of each spring plate being arcuate so as to present an approximately cylindrical surface, the generating line of which extends in parallel relation to the spring plate diameter traversing the webs, and the spring plate being ripped open radially in the area of at least part of the webs by the provision of a radial slot.

By the design according to the invention bending stresses are completely avoided in the area of the slotted webs so that the spring plate is practically nowhere subject to any critical stress. Moreover, the softness of the spring plate is further enhanced by the slots provided in the area of the webs so that safety against breakage can be additionally increased by augmenting the thickness of the plates by way of compensation without exceeding the admissible degree of elasticity.

Preferably, the radial slot is provided approximately in the middle of the web width. Furthermore, the spring plate may present a greater radius of curvature in the areas adjoining the radial slot than in the areas diametrically opposite the radial slot. This particular design of the spring plate according to the invention precludes any objectionable raising of the edges of the radial slot during the operation of the valve and prevents these edges from working into adjacent surfaces of the valve plate or of the valve guard or of a damper or cushion plate, if provided.

The provision of a radial slot is particularly useful in connection with spring plates wherein the adjacent rings are interconnected by a single web only. If all the webs are located on the same side of the spring plate center, in a conventional setup comprising two spring plates the radial slots of the two superimposed spring plates are preferably offset in relation to each other at an angle of approximately 180°, thereby avoiding the one-sided strain on the valve plate which might occur if one spring plate only were used.

BRIEF DESCRIPTION OF THE DRAWING

Further optional details of the invention will appear from the following description of several embodiments of the invention with reference to the accompanying drawing in which:

FIG. 1 shows a plan view of a spring plate according to the invention;

FIG. 2 is a side elevation of the spring plate;

FIG. 2a is a detail of FIG. 2 on an enlarged scale;

FIGS. 3 and 4 each show plan views of another embodiments of the spring plate according to the invention; and FIG. 5 is a cross section of the complete valve.

DESCRIPTION OF PREFERRED EMBODIMENTS

In all embodiments of the invention illustrated, the spring plate 1 comprises a plurality of concentric rings 2, adjacent rings being interconnected by means of a web 3. All webs 3 are located on the same plate diameter. As shown in FIG. 1, webs 3 are provided on one side of the plate center only. As a result, the concentric rings 2 have a free length extending practically over the entire periphery of the spring plate and are allowed free movement in an axial direction unimpeded by adjacent rings. A similar result obtains where, as shown in FIG. 3, the webs 3 are located alternatingly on different sides of the plate center, although likewise on a single spring plate diameter.

As appears from FIG. 2, the spring plate 1 is arcuate so as to present an approximately cylindrical or part-cylindrical surface, the generating line of which extends in parallel relation to the spring plate diameter traversing the webs 3. During the operation of the valve the arcuate spring plate 1 is flattened by the valve plate during the opening motion of the latter and thereby subjected to a bending stress. In order to avoid critical stresses in the area of the webs 3, the spring plate 1 is ripped up radially in that area by one or a plurality of radial slots 4. According to the embodiments shown in FIGS. 1 and 3, the slots 4 are provided in the middle of the web width. One of the slots 4 presents an enlargement 5 serving to receive a guide pin (not shown). In a similar manner as shown in FIG. 3, the slot 4 of FIG. 1 can also extend beyond the middle of the spring plate and sever the innermost ring or several rings on the side of the plate center opposite the webs 3 so as to avoid excessive stiffness in the central portion of the spring plate. By ripping up the webs 3 and possibly also a few rings 2 the spring plate 1 is lackened and its softness increased. Thus, the strain on the spring plate is reduced precisely in the area of the webs where the risk of breakage is greatest, which results in a substantially longer service life of the spring plate. Furthermore, as compared with conventional types of spring plates, for a predetermined degree of elasticity the thickness of the spring plate 1 may be increased, thereby further reducing the risk of breakage.

The spring plates illustrated in FIGS. 1 and 3 are intended for multiple-ring valves comprising slidingly guided plates with the inner rim of the innermost ring 2 adjoining a guide surface (not shown). The spring plate shown in FIG. 4, however, is preferably used in connection with so-called frictionless guidance-type valves. In that case, the spring plate 1 comprises a hub 6 and an adjacent flexible guide arm 7 connected with the concentric rings 2. Again, the radial slot 4 extends through the webs 3 located on one side of the plate center only, the guide arm 7 engaging, however, one-half of the web only. The hub 6 serving as a clamping means for the spring plate 1 in the valve is not slotted.

As appears from FIG. 2a, the arcuate portion of the spring plate 1 in the areas 8 adjoining the radial slot 4 presents a different radius of curvature from the one prevailing in the plate area opposite the radial slot. In the proximity of slot 4 the radius of curvature is greater or the plate areas 8 are essentially uncurved, which precludes an objectionably strong upward pressure on the edges of the radial slot 4 during the compression of the spring plate 1, so that they are not allowed to work into the surface adjoining the spring plate of the assembled valve.

FIG. 5 shows the complete valve according to the invention having a spring plate as shown in FIG. 1 of applicant's U.S. Pat. No. 3,265,085, issued Aug. 9, 1966. The ring valve shown in FIG. 5 comprises a valve seat 1' and a valve guard 2', both members being centered and positively attached to each other by means of a bolt 3' and nut 4'. Between the valve seat 1' and the valve guard 2' a washer 5' is provided, which determines the distance between the said members and also serves as a guide for the valve plate 6' and the spring plate 7' loading the former.

I claim:

1. A multiple-ring valve, particularly for piston-type compressors, comprising a valve seat and a valve guard arranged in spaced relation to same, a closing member located between the valve seat and the valve guard and loaded by means of at least one arcuate spring plate formed by concentric rings interconnected by means of webs, adjacent rings of each spring plate being interconnected by not more than two webs, all of the webs of the spring plate being located on the same plate diameter, at least one ring of each spring plate being arcuate so as to present an approximately cylindrical surface, the generating line of which extends in parallel relation to the spring plate diameter traversing the webs, and the spring plate being ripped open radially in the area of at least part of the webs by the provision of a radial slot provided approximately in the middle of the web width and the spring plate presenting a greater radius of curvature in the areas adjoining the radial slot than in the plate areas diametrically opposite the radial slot.